May 13, 1941.                F. TENCH                2,241,871
METHOD OF ELECTRIC WELDING
Filed June 3, 1939

INVENTOR
Frederick Tench
BY
Townsend + Decker
ATTORNEYS

Patented May 13, 1941

2,241,871

UNITED STATES PATENT OFFICE 2,241,871

METHOD OF ELECTRIC WELDING

Frederick Tench, White Plains, N. Y., assignor to L. T. Corporation, New York, N. Y., a corporation of New Jersey Application June 3, 1939, Serial No. 277,174

2 Claims. (Cl. 219—10)

This invention relates to a method of electric welding metallic structures and more specifically composite metal work employing crossing or intersecting members so joined or connected together, as to leave the outer surfaces of the members smooth and unmarred and free from burrs at the points of junction.

In its more specific embodiment, the invention has for its object the production, by means of the process of the invention of an improved metallic window sash or analogous structure comprising intersecting T-shaped intersecting members forming panels adapted to receive and support panes of glass therein, the outer surfaces of the heads of the T-shaped members lying in a common plane and being so welded together as to leave the joint formed by the welded portions of the members practically imperceptible.

A further object of the invention is the production of a metallic structure of the character described which may be economically manufactured with facility and expedition.

A further object of the invention consists or lies in the practicing of a simple and improved process or method wherein a strong and durable structure possessing the characteristics heretofore pointed out may be produced.

While the invention is about to be described with relation to a metallic window sash, it is to be understood that it is not limited in its application to a window sash per se but it is equally applicable to any metallic structure employing crossing or intersecting members. It is employed preferably, however, to metallic structures in which the crossing or intersecting members are T-shaped in cross-section.

To the above ends, my invention consists in the improved method of producing a metallic structure hereinafter more particularly described and then specified in the claims.

In the accompanying drawing illustrating a practical embodiment of the invention:

Figure 1:
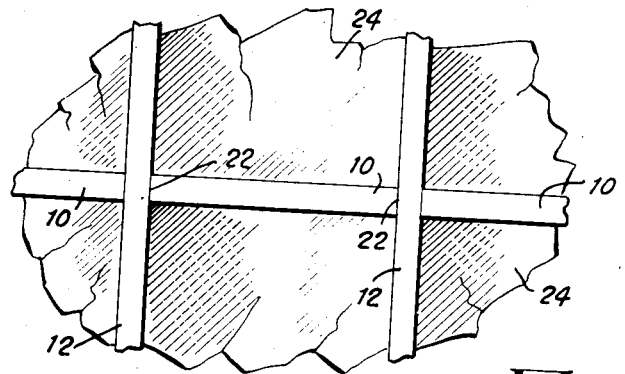
Fig. 1 is a fragmentary plan view of a metallic window sash produced in accordance with the invention.

Referring in detail to the several figures of the drawing, reference numeral 10 indicates the laterally-extending flanged head of one of the T-shaped members while 11 indicates its web and 12 indicates the head of the other T-shaped member, its web being shown at 13. As illustrated in the drawing, the web 11 preferably is of greater depth than the web 13. For connecting the parts together in intersected relation it is preferred to provide the head 10 with a transverse slot 14 of a width slightly more narrow than the width of the head 12 and also to provide the web 11 with a downwardly extending slot 15 for reception of the web 13 and extending transversely of the slot 14.

Figure 2:
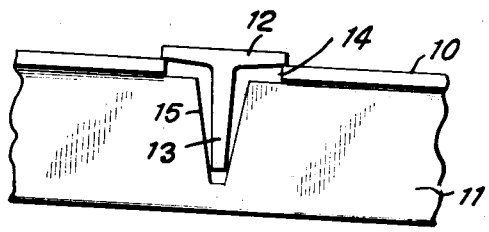
Fig. 2 is a side elevation of two of the crossing or intersecting members in position before the welding operation has been performed to complete the joint therebetween.

In order to integrally connect together the parts just described, they are assembled in the position shown in Figure 2 with the ends of the head 12 spanning or bridging the slot 14 and engaging and overlapping the upper side of the head 10 with the web 13 entering the slot 15. An upper welding die or electrode 16, of copper or other suitable current-conducting material, is provided and it has a flat lower side or surface for engagement with the upper surface of the head 12. This die is connected with a suitable source of heating electric current of proper volume (not shown) and means are also provided (not shown) for moving or forcing said die downwardly, as well known in the art, for applying pressure to the head 12. For completing the welding current, a supplemental upper welding die or electrode 17 is provided of any suitable form but preferably of the form shown whereby it will straddle the welding die or electrode 16 and will exert pressure against and clamp the head 10 firmly during the welding operation. The welding die 16 preferably has a dual function, to wit: that of simultaneously supplying heating current as well as pressure to the work, while the welding die 17 acts as a conductor for the return of the current to the source of supply, although if so desired, it may have a clamping action on the head 10, as has been described. This clamping action, as will be apparent, is exerted at either side of the work on the head and preferably equidistant from the points of welding.

A supporting block or table is indicated at 18 and it is provided with a longitudinal slot 19 for reception of the web 13 and with a transverse intersecting slot 20 for reception of the web 11. Adjacent its upper surface or side it is also provided with the longitudinally extending grooves or channels 21. This supporting block or table is preferably made of steel or any other hard and pressure-resistant material such as "elkonite."

Figure 3:
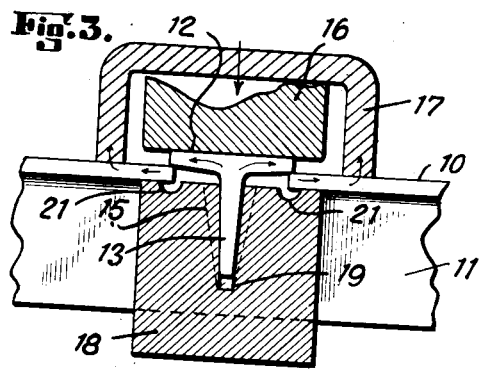
Fig. 3 is a similar view showing the welding dies or electrodes and supporting block or table in section and in proper position with relation to the members to be welded together and before the welding operation is effected.
Figure 6:
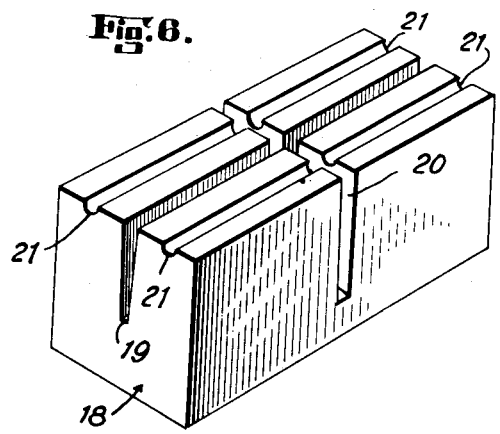
Fig. 6 is a perspective view of the preferred form of the supporting block or table employed during the welding operation.
Figure 4:
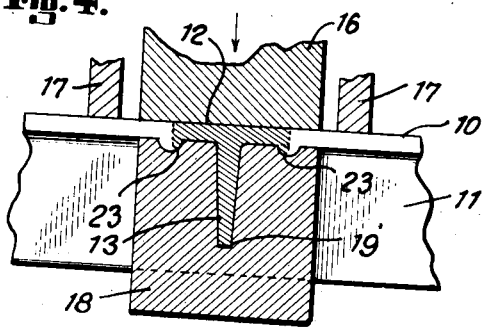
Fig. 4 is a similar view, but with one of the members in section, after the completion of the welding operation.

When performing the welding operation, the supporting block or table 18 is mounted beneath the work to be welded and it supports at its sides the underside of head 10 with the web 13 entering the slot 19 and the web 11 entering the slot 20. When in this position the grooves or channels 21 lie directly beneath and in alignment with those parts of the heads of both members which are to be welded together. The welding dies or electrodes are then in the position previously described and in engagement with heads 12 and 10 respectively, and as shown in Figures 3 and 4, and welding current and pressure is then applied to die 16. The heating welding current passes through the work and back through the welding die 17, as indicated by the arrows, and to the source of supply. By the action of such heating current and pressure the metal of the overlapped parts of the heads 10 and 12 softens and the head 12 will be forced within the slot 14 by pressure of die 16. The molten metal of one head thereupon coalesces with that of the other to thereby effect an electrically welded union of the members together and produce a joint wherein the top surfaces of the intersecting members lie in a common plane and one which is free from burrs or other unsightly extruded metal.

Figure 5:
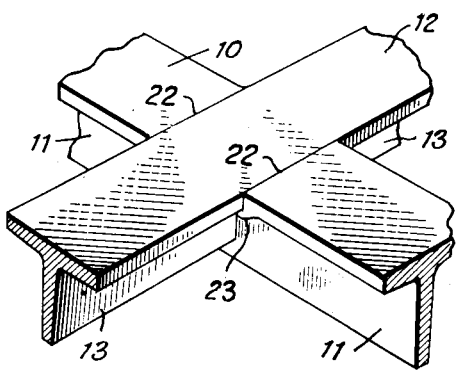
Fig. 5 is a fragmentary perspective view of a portion of the completed welded structure.

The demarcation defining the separate parts of the finished composite product, after performance of the welding operation, is so slight as to be almost imperceptible and is indicated at 22 in Figure 5. During the welding operation the excess or extrusion of metal resulting therefrom flows into the grooves 21 of the supporting block 18, these grooves being provided for that purpose. Such excess or extrusion of metal is indicated at 23 and is thus hidden from view in the completed product. The completed product may take, among others, the form of a panelled window sash in which panes of glass 24 may be supported in any manner beneath and behind the flanged heads 10 and 12.

The invention claimed is:

1. The method of electrically welding metallic rectangularly-shaped crossing members together consisting in providing one of said members with a slot of less width than the width of the other of said members, bridging said slot with the other of said members in undeformed condition, passing heating electric current through the overlapping portions of said members while applying pressure to force the other of said members within the aforesaid slot and to integrally unite the members together while forcing the excess molten metal extruded by the welding operation to flow beneath the members and to become a part of the welded joint at the intersection between the lower corners of the walls of the slot and the lower corners of said other member while leaving the upper surfaces of both members unobstructed and lying in a plane substantially common to both of them with the upper corners formed by the intersection of the members substantially free from extruded metal.

2. The method of electrically welding together intersecting T-shaped metallic members each provided with a flanged-like head and with a web integral therewith consisting in providing the web of the first member with a slot and its head with a communicating slot of less width than the width of the head of the second member, mounting said second member in undeformed condition on said first member with the web of said second member entering the slot in said first member and the head of said second member engaging the head of said first member and bridging the communicating slot of said first member and applying heating current to the heads of both members while applying pressure to integrally unite the heads together while forcing the excess extruded metal resulting from the welding operation to flow beneath the heads of the members and become an integral part of the welded joint at the intersections between the lower edges of the walls of the communicating slot with the lower edges of the side walls of the head of said second member while leaving the upper surfaces of the heads of both members unobstructed and lying in a plane substantially common to both of them with the corners formed by the intersecting heads substantially free from extruded metal.

FREDERICK TENCH.